US012749637B2

(12) United States Patent
Nault et al.

(10) Patent No.: US 12,749,637 B2
(45) Date of Patent: Sep. 29, 2026

(54) OVERMOLDED ELECTRICAL DEVICE WITH LOW ELECTRICAL STRESS PARTING LINES

(71) Applicant: G & W Electric Company, Bolingbrook, IL (US)

(72) Inventors: Brian Nault, Lockport, IL (US); Stefan Micic, North Miami, FL (US); Foster Pyle, Oswego, IL (US); Andrew Wegner, Aurora, IL (US); Steven Bucaro, North Aurora, IL (US); Zach Tranchida, Bolingbrook, IL (US); Blair Kerr, Downers Grove, IL (US); Philip Gronberg, Geneva, IL (US)

(73) Assignee: G & W Electric Company, Bolingbrook, IL (US)

( * ) Notice: Subject to any disclaimer, the term of this patent is extended or adjusted under 35 U.S.C. 154(b) by 289 days.

(21) Appl. No.: 18/417,932

(22) Filed: Jan. 19, 2024

(65) Prior Publication Data

US 2025/0239424 A1 Jul. 24, 2025

(51) Int. Cl.
*H01H 33/662* (2006.01)

(52) U.S. Cl.
CPC ............................ *H01H 33/66207* (2013.01); *H01H 33/66261* (2013.01); *H01H 2033/66223* (2013.01); *H01H 2033/6623* (2013.01); *H01H 2033/66276* (2013.01)

(58) Field of Classification Search
CPC ........... H01H 2033/66223; H01H 2033/66276
USPC ........ 218/139, 138, 136, 147, 118, 155, 134
See application file for complete search history.

(56) References Cited

U.S. PATENT DOCUMENTS

| | | | |
|---|---|---|---|
| 2,138,382 | A | 11/1938 | Leeds et al. |
| 2,200,122 | A | 5/1940 | RawlinsHerbert |
| 2,253,009 | A | 8/1941 | BakerBenjamin |
| 2,318,421 | A | 5/1943 | Rawlins et al. |
| 2,337,820 | A | 12/1943 | HodnetteJohn |
| 2,352,048 | A | 6/1944 | WallaceJames |
| 2,444,765 | A | 7/1948 | Boisseau et al. |

(Continued)

FOREIGN PATENT DOCUMENTS

| | | | |
|---|---|---|---|
| CA | 2083900 | A1 | 5/1993 |
| EP | 3961668 | B1 | 6/2023 |

(Continued)

*Primary Examiner* — William A Bolton
(74) *Attorney, Agent, or Firm* — Michael Best & Friedrich LLP

(57) ABSTRACT

An electrical device includes an internal electrical conductor that extends along a longitudinal axis. An insulator is overmolded around the internal electrical conductor such that the insulator includes first and second insulator portions with a parting plane at an interface between the first and second insulator portions. The parting plane is oriented such that it intersects the longitudinal axis. The electrical device may include a low electrical stress area defined by an electrical shield, wherein the parting line may be disposed entirely within the low electrical stress area. The electrical device may be a switchgear that includes a vacuum interrupter assembly having a vacuum bottle surrounded by an insulating sleeve comprising first and second sleeve portions with a parting plane at an interface between the first and second sleeve portions. The parting plane is oriented such that it intersects the longitudinal axis.

22 Claims, 9 Drawing Sheets

(56) References Cited

U.S. PATENT DOCUMENTS

| | | | | |
|---|---|---|---|---|
| 2,542,790 | A | 2/1951 | Baker et al. | |
| 2,562,391 | A | 7/1951 | Rawlins et al. | |
| 2,584,764 | A | 2/1952 | WallaceJames | |
| 2,624,817 | A | 1/1953 | Rawlins et al. | |
| 2,809,259 | A | 10/1957 | Baker et al. | |
| 2,870,298 | A | 1/1959 | Schwager | |
| 2,889,434 | A | 6/1959 | Lingal | |
| 3,166,658 | A | 1/1965 | Emmett | |
| 3,283,103 | A | 11/1966 | Greenwood et al. | |
| 3,499,129 | A | 3/1970 | Hulteen et al. | |
| 3,514,559 | A | 5/1970 | Ranheim | |
| 3,539,747 | A | 11/1970 | Robinson | |
| 3,590,184 | A | 6/1971 | Wachta et al. | |
| 3,898,406 | A | 8/1975 | Larkin | |
| 4,000,999 | A | 1/1977 | Lucek et al. | |
| 4,168,414 | A | 9/1979 | Kumbera et al. | |
| 4,384,185 | A | 5/1983 | Hall et al. | |
| 4,393,286 | A | 7/1983 | Takagi | |
| 4,421,961 | A | 12/1983 | Sakuma et al. | |
| 4,434,331 | A | 2/1984 | Sakuma et al. | |
| 4,489,226 | A | 12/1984 | Holmgren et al. | |
| 4,516,004 | A | 5/1985 | Bany et al. | |
| 4,568,804 | A | 2/1986 | Luehring | |
| 4,609,798 | A | 9/1986 | Nicoloso | |
| 4,672,156 | A | 6/1987 | Basnett | |
| 4,713,505 | A | 12/1987 | Date et al. | |
| 4,816,959 | A | 3/1989 | Maier et al. | |
| 4,880,947 | A | 11/1989 | Fey et al. | |
| 4,896,008 | A | 1/1990 | Aoki et al. | |
| 4,963,819 | A | 10/1990 | Clarke et al. | |
| 5,059,753 | A | 10/1991 | Hamm | |
| 5,091,616 | A | 2/1992 | Ramos et al. | |
| 5,269,055 | A | 12/1993 | Kessi | |
| 5,286,932 | A | 2/1994 | Rouch et al. | |
| 5,286,933 | A | 2/1994 | Pham | |
| 5,321,221 | A | 6/1994 | Rozier | |
| 5,350,892 | A | 9/1994 | Rozier | |
| 5,387,772 | A | 2/1995 | Bestel | |
| 5,585,611 | A | 12/1996 | Harvey et al. | |
| 5,597,992 | A | 1/1997 | Walker | |
| 5,667,060 | A | 9/1997 | Luzzi | |
| 5,717,185 | A | 2/1998 | Smith | |
| 5,729,888 | A | 3/1998 | Abdelgawad et al. | |
| 5,736,705 | A | 4/1998 | Bestel et al. | |
| 5,747,765 | A | 5/1998 | Bestel et al. | |
| 5,808,258 | A * | 9/1998 | Luzzi ............... | H01H 33/66207 218/138 |
| 5,864,942 | A | 2/1999 | Luzzi | |
| 5,912,604 | A | 6/1999 | Harvey et al. | |
| 5,917,167 | A | 6/1999 | Bestel | |
| 6,310,310 | B1 | 10/2001 | Wristen | |
| 6,414,257 | B1 | 7/2002 | Luscan et al. | |
| 6,723,940 | B1 | 4/2004 | Book et al. | |
| 6,747,234 | B2 | 6/2004 | Traska et al. | |
| 6,818,850 | B2 | 11/2004 | Bridges | |
| 6,828,521 | B2 | 12/2004 | Stoving et al. | |
| 6,858,172 | B2 | 2/2005 | Daharsh et al. | |
| 6,897,396 | B2 | 5/2005 | Ito et al. | |
| 7,215,228 | B2 | 5/2007 | Rhein | |
| 7,239,492 | B2 | 7/2007 | Heimbach et al. | |
| 7,285,743 | B2 * | 10/2007 | Martin ................. | H01H 33/027 218/138 |
| 7,385,155 | B2 | 6/2008 | Trivette et al. | |
| 7,445,850 | B2 | 11/2008 | Makino | |
| 7,563,161 | B2 | 7/2009 | Perret | |
| 7,589,289 | B2 | 9/2009 | Yu | |
| 7,639,113 | B2 | 12/2009 | Heller | |
| 7,852,180 | B2 | 12/2010 | Gentsch et al. | |
| 7,854,058 | B2 | 12/2010 | Schreiber et al. | |
| 7,887,732 | B2 | 2/2011 | Daharsh et al. | |
| 7,902,479 | B2 | 3/2011 | Tsuchiya et al. | |
| 7,910,852 | B2 | 3/2011 | Chen et al. | |
| 8,110,771 | B2 | 2/2012 | Takahashi et al. | |
| 8,178,812 | B2 | 5/2012 | Martin et al. | |
| 8,198,562 | B2 | 6/2012 | Bodenstein et al. | |
| 8,284,002 | B2 | 10/2012 | Heller et al. | |
| 8,350,174 | B2 | 1/2013 | Gentsch | |
| 8,354,607 | B2 | 1/2013 | Sato et al. | |
| 8,445,805 | B2 | 5/2013 | Glaser | |
| 8,462,485 | B2 | 6/2013 | Lee | |
| 8,642,912 | B2 | 2/2014 | Lee | |
| 8,658,932 | B2 | 2/2014 | Schellekens et al. | |
| 8,674,254 | B2 | 3/2014 | Borgstrom | |
| 8,677,609 | B2 | 3/2014 | Shang | |
| 8,785,802 | B2 | 7/2014 | Shang | |
| 8,861,144 | B2 | 10/2014 | Shea et al. | |
| 8,999,433 | B2 | 4/2015 | Beisele et al. | |
| 9,040,861 | B2 | 5/2015 | Park | |
| 9,147,542 | B2 | 9/2015 | Parashar | |
| 9,165,733 | B2 | 10/2015 | Reuber et al. | |
| 9,214,292 | B2 | 12/2015 | Bramhapurikar et al. | |
| 9,269,515 | B2 | 2/2016 | Huang et al. | |
| 9,312,669 | B2 | 4/2016 | Morita et al. | |
| 9,336,960 | B2 | 5/2016 | Gentsch | |
| 9,368,301 | B2 | 6/2016 | Campbell et al. | |
| 9,390,873 | B2 | 7/2016 | Thomas | |
| 9,425,005 | B2 | 8/2016 | Gentsch | |
| 9,437,374 | B2 | 9/2016 | Siebens | |
| 9,443,681 | B2 | 9/2016 | Siebens | |
| 9,576,757 | B2 | 2/2017 | Opfer | |
| 9,633,802 | B2 | 4/2017 | Chapelle et al. | |
| 9,633,807 | B2 | 4/2017 | Ache et al. | |
| 9,640,350 | B2 | 5/2017 | Stoving et al. | |
| 9,679,708 | B2 | 6/2017 | Benson, IV et al. | |
| 10,115,547 | B2 | 10/2018 | Gerovac et al. | |
| 10,153,098 | B2 | 12/2018 | Hayashi et al. | |
| 10,170,255 | B1 | 1/2019 | Glaser | |
| 10,262,819 | B2 | 4/2019 | Nagatake et al. | |
| 10,262,820 | B2 | 4/2019 | Phillpotts et al. | |
| 10,347,447 | B2 | 7/2019 | Miyatake et al. | |
| 10,418,192 | B1 | 9/2019 | Yang | |
| 10,453,633 | B2 * | 10/2019 | Wang ............... | H01H 33/66261 |
| 10,460,893 | B2 | 10/2019 | Shang et al. | |
| 10,601,170 | B2 | 3/2020 | Gieger et al. | |
| 10,614,976 | B2 | 4/2020 | Borgstrom et al. | |
| 10,818,455 | B2 | 10/2020 | Djogo | |
| 10,978,256 | B1 | 4/2021 | Schafer | |
| 11,139,126 | B2 | 10/2021 | Pohle | |
| 2002/0088775 | A1 | 7/2002 | Bridges | |
| 2002/0134757 | A1 | 9/2002 | Nishizumi et al. | |
| 2003/0150841 | A1 | 8/2003 | Magnussen et al. | |
| 2004/0242034 | A1 | 12/2004 | Rinehart et al. | |
| 2004/0251237 | A1 | 12/2004 | Meyer et al. | |
| 2005/0029001 | A1 | 2/2005 | Sato et al. | |
| 2006/0011589 | A1 | 1/2006 | Hering et al. | |
| 2007/0279197 | A1 * | 12/2007 | No ........................... | H04B 3/56 340/12.37 |
| 2010/0170774 | A1 | 7/2010 | Einschenk et al. | |
| 2010/0314357 | A1 | 12/2010 | Kobayashi et al. | |
| 2011/0056916 | A1 | 3/2011 | Claus et al. | |
| 2012/0014041 | A1 | 1/2012 | Gentsch et al. | |
| 2013/0212873 | A1 | 8/2013 | Kowalyshen et al. | |
| 2014/0138357 | A1 | 5/2014 | Kasza et al. | |
| 2015/0041437 | A1 * | 2/2015 | Chapelle ................ | H01H 9/346 218/139 |
| 2016/0126037 | A1 * | 5/2016 | Gerovac .............. | H01H 33/666 218/139 |
| 2016/0181027 | A1 | 6/2016 | Cao et al. | |
| 2017/0104279 | A9 | 4/2017 | Dais et al. | |
| 2017/0186574 | A1 * | 6/2017 | Gentsch ........... | H01H 33/66207 |
| 2019/0259553 | A1 | 8/2019 | Hillmann | |
| 2021/0125803 | A1 | 4/2021 | Sikora et al. | |
| 2021/0398760 | A1 | 12/2021 | Korves et al. | |
| 2022/0076910 | A1 | 3/2022 | Stoving et al. | |
| 2022/0103010 | A1 | 3/2022 | Quinlan et al. | |
| 2022/0157544 | A1 | 5/2022 | Ranedo Torres et al. | |
| 2022/0216022 | A1 | 7/2022 | Shamseldin et al. | |

FOREIGN PATENT DOCUMENTS

| | | | |
|---|---|---|---|
| WO | 9001788 | A1 | 2/1990 |
| WO | 9527298 | A1 | 10/1995 |
| WO | 0007202 | A3 | 4/2000 |
| WO | 0041199 | A1 | 7/2000 |

(56) References Cited

FOREIGN PATENT DOCUMENTS

| | | | |
|---|---|---|---|
| WO | 2000041199 | A1 | 7/2000 |
| WO | 2004086437 | A1 | 10/2004 |
| WO | 2006103053 | A1 | 10/2006 |
| WO | 2008077878 | A1 | 7/2008 |
| WO | 2008082303 | A1 | 7/2008 |
| WO | 2005078461 | A3 | 12/2008 |
| WO | 2009030661 | A1 | 3/2009 |
| WO | 2009030721 | A1 | 3/2009 |
| WO | 2009043769 | A1 | 4/2009 |
| WO | 2014122053 | A1 | 8/2014 |
| WO | 2015028141 | A1 | 3/2015 |
| WO | 2015136932 | A1 | 9/2015 |
| WO | 2015178072 | A1 | 11/2015 |
| WO | 2016067647 | A1 | 5/2016 |
| WO | 2017020675 | A1 | 2/2017 |
| WO | 2017161597 | A1 | 9/2017 |
| WO | 2018058196 | A1 | 4/2018 |
| WO | 2018107714 | A1 | 6/2018 |
| WO | 2018126020 | A1 | 7/2018 |
| WO | 2018131124 | A1 | 7/2018 |
| WO | 2018138754 | A1 | 8/2018 |
| WO | 2018163703 | A1 | 9/2018 |
| WO | 2019115133 | A1 | 6/2019 |
| WO | 2019119996 | A1 | 6/2019 |
| WO | 2020001926 | A1 | 1/2020 |
| WO | 2020177446 | A1 | 9/2020 |
| WO | 2020219899 | A1 | 10/2020 |
| WO | 2021069169 | A1 | 4/2021 |
| WO | 2021083893 | A1 | 5/2021 |
| WO | 2021148217 | A1 | 7/2021 |
| WO | 2021148218 | A1 | 7/2021 |

* cited by examiner

OVERMOLDED ELECTRICAL DEVICE WITH LOW ELECTRICAL STRESS PARTING LINES

FIELD

The present disclosure relates to electrical devices, such as switchgear, vacuum interrupters, terminations, bushings, and cables, having an insulator overmolded around an internal electrical conductor.

BACKGROUND

Different types of electrical devices that include an electrical conductor, such as switchgear, vacuum interrupters, terminations, bushings, and cables, may include an insulator overmolded around the device's electrical conductor. One or more parting lines may exist in the overmolded insulator where mold haves used to form the insulator meet.

SUMMARY

The parting lines in the overmolded insulator may be more susceptible to electrical leakage and breakdown than remaining portions of the insulator, particularly if located in regions of high electrical stress. Typical overmolded insulators have a parting line arranged longitudinally, extending centrally between opposite ends of the insulator. However, the ends of the insulator may also be regions of high electrical stress. Accordingly, a need exists for an overmold formed in a way to avoid having parting lines in such regions of high electrical stress.

In some aspects, the techniques described herein relate to an electrical device including: a vacuum bottle extending along a longitudinal axis and having a first portion and a second portion; a sleeve overmolded on the vacuum bottle such that the sleeve includes a first sleeve portion, a second sleeve portion, and a parting plane at an interface between the first and second sleeve portions, wherein the parting plane intersects the longitudinal axis; a terminal extending from the first portion of the vacuum bottle; and an interchange coupled to the second portion of the vacuum bottle.

In some aspects, the techniques described herein relate to an electrical device, further including an electrical shield screen positioned adjacent the terminal, wherein the electrical shield screen forms a low-stress area and the parting plane lies entirely within the low-stress area.

In some aspects, the techniques described herein relate to an electrical device, wherein the sleeve is compressed between the terminal and the first portion of the vacuum bottle, and no portion of the parting plane passes through an area in which the sleeve contacts the first terminal.

In some aspects, the techniques described herein relate to an electrical device, wherein the parting plane is oriented transverse relative to the longitudinal axis.

In some aspects, the techniques described herein relate to an electrical device, wherein the sleeve forms a seal between the interchange and the second portion of the vacuum bottle, and no portion of the parting plane passes through the seal.

In some aspects, the techniques described herein relate to an electrical device, wherein the parting plane is a first parting plane, wherein the second sleeve portion further includes a second parting plane that divides the second sleeve portion in two, and wherein the second parting plane is oriented at an angle greater than zero degrees relative to the first parting plane.

In some aspects, the techniques described herein relate to an electrical device, wherein the sleeve is compressed between the terminal and the first portion of the vacuum bottle, wherein the sleeve forms a seal between the interchange and the second portion of the vacuum bottle, and wherein no portion of the first parting plane or second parting plane passes through an area in which the sleeve contacts the first terminal or through the seal.

In some aspects, the techniques described herein relate to an electrical device, wherein the second parting plane is oriented transverse relative to the first parting plane.

In some aspects, the techniques described herein relate to an electrical device, further including an electrical shield screen positioned adjacent the interchange, wherein the electrical shield screen forms a low-stress area, and the parting plane lies entirely within the low-stress area.

In some aspects, the techniques described herein relate to an electrical device, further including an electrical shield screen positioned adjacent the first portion of the vacuum bottle, wherein the electrical shield screen forms a low-stress area, and the parting plane lies entirely within the low-stress area.

In some aspects, the techniques described herein relate to an electrical device, further including an electrical shield screen at least partially surrounding the vacuum bottle, wherein the electrical shield screen forms a low-stress area, and the parting plane lies entirely within the low-stress area.

In some aspects, the techniques described herein relate to an electrical device, wherein the first sleeve portion includes a first draft portion adjacent to the terminal that becomes wider in a longitudinal direction moving away from the terminal and the second sleeve portion includes a second draft portion adjacent to the interchange that becomes wider in a longitudinal direction moving away from the interchange.

In some aspects, the techniques described herein relate to an electrical device, wherein the sleeve is compressed between the terminal and the first portion of the vacuum bottle, wherein the sleeve forms a seal between the interchange and the second portion of the vacuum bottle, and no portion of the parting plane passes through an area in which the sleeve contacts the first terminal or through the seal.

In some aspects, the techniques described herein relate to an electrical device including: a vacuum bottle extending along a longitudinal axis and having a first portion and a second portion, the vacuum bottle including a pair of electrical contacts configured to open and close an electric circuit; and a sleeve overmolded on the vacuum bottle such that the sleeve includes a first sleeve portion, a second sleeve portion, and a parting plane at an interface between the first and second sleeve portions, wherein the parting plane intersects the longitudinal axis.

In some aspects, the techniques described herein relate to an electrical device, further including an electrical shield screen at least partially surrounding the vacuum bottle, wherein the electrical shield screen forms a low-stress area, and the parting plane lies entirely within the low-stress area.

In some aspects, the techniques described herein relate to an electrical device, wherein the parting plane is a first parting plane, wherein the second sleeve portion further includes a second parting plane that divides the second sleeve portion in two, and wherein the second parting plane is oriented at an angle greater than zero degrees relative to the first parting plane.

In some aspects, the techniques described herein relate to an electrical device, wherein the second parting plane is oriented transverse relative to the first parting plane.

In some aspects, the techniques described herein relate to an electrical device including: an internal electrical conductor extending along a longitudinal axis; an insulator overmolded around the internal electrical conductor such that the insulator includes a first insulator portion, a second insulator portion, and a parting plane at an interface between the first and second insulator portions, wherein the parting plane intersects the longitudinal axis.

In some aspects, the techniques described herein relate to an electrical device, further including a low stress area defined by an electrical shield, wherein the parting plane is disposed entirely within the low stress area.

In some aspects, the techniques described herein relate to an electrical device, wherein the parting plane is oriented transverse relative to the longitudinal axis.

In some aspects, the techniques described herein relate to an electrical device, wherein the parting plane is a first parting plane, wherein the second insulator portion includes a second parting plane that divides the second insulator portion in two, and wherein the second parting plane is oriented at an angle greater than zero degrees relative to the first parting plane.

In some aspects, the techniques described herein relate to an electrical device, wherein the second parting plane is oriented transverse relative to the first parting plane.

Other aspects of the disclosure will become apparent by consideration of the detailed description and accompanying drawings.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of supporting other embodiments and of being practiced or of being carried out in various ways. Also, it is to be understood that the phraseology and terminology used herein is for the purpose of description and should not be regarded as limiting. Also, as used herein and in the appended claims, the terms "upper," "lower," "top," "bottom," "front," "back," and other directional terms are not intended to require any particular orientation but are instead used for purposes of description only.

Figure 1:
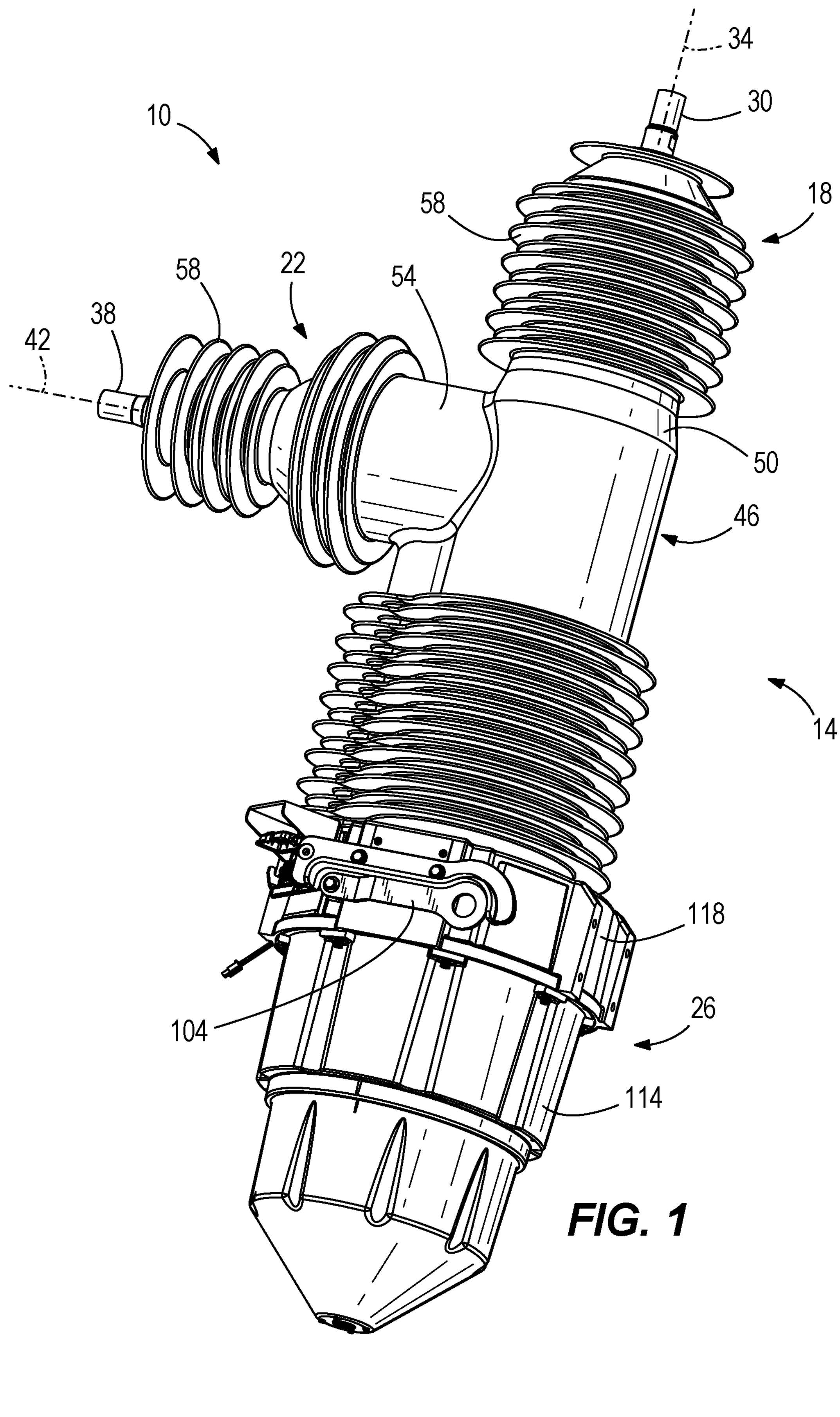
FIG. 1 illustrates a perspective view of a switchgear apparatus according to an embodiment of the present disclosure.

FIG. 1 illustrates an exemplary switchgear apparatus 10 according to one embodiment of the present disclosure. The exemplary switchgear apparatus 10 may be configured for operation at a distribution voltage (e.g., between about 4 kV and about 35 kV). In other embodiments, the switchgear apparatus 10 may be configured for operation at a higher, subtransmission voltage (e.g., between about 35 kV and about 138 kV).

The illustrated switchgear apparatus 10 includes a housing assembly 14, a vacuum interrupter ("VI") assembly 18 (i.e., an electrical device), a conductor assembly 22, which in some embodiments may be a load-side conductor assembly 22 and in other embodiments may be a source-side conductor assembly 22, and an actuator assembly 26. The VI assembly 18 includes a first terminal 30 extending from the housing assembly 14 along a first longitudinal axis 34, and the conductor assembly 22 includes a second terminal 38 extending from the housing assembly 14 along a second longitudinal axis 42 perpendicular to the first longitudinal axis 34. In other embodiments, the second longitudinal axis 42 may be obliquely oriented relative to the first longitudinal axis 34. The illustrated switchgear apparatus 10 is a recloser, such that the actuator assembly 26 may operate the VI assembly 18 to selectively break and/or reestablish a conductive pathway between the first and second terminals 30, 38. Although the switchgear apparatus 10 is illustrated individually in FIG. 1, the switchgear apparatus 10 may be part of a recloser system including a plurality of reclosers 10, each associated with a different phase of a three-phase power transmission system and ganged together such that operation of the plurality of reclosers 10 is synchronized.

Figure 2:
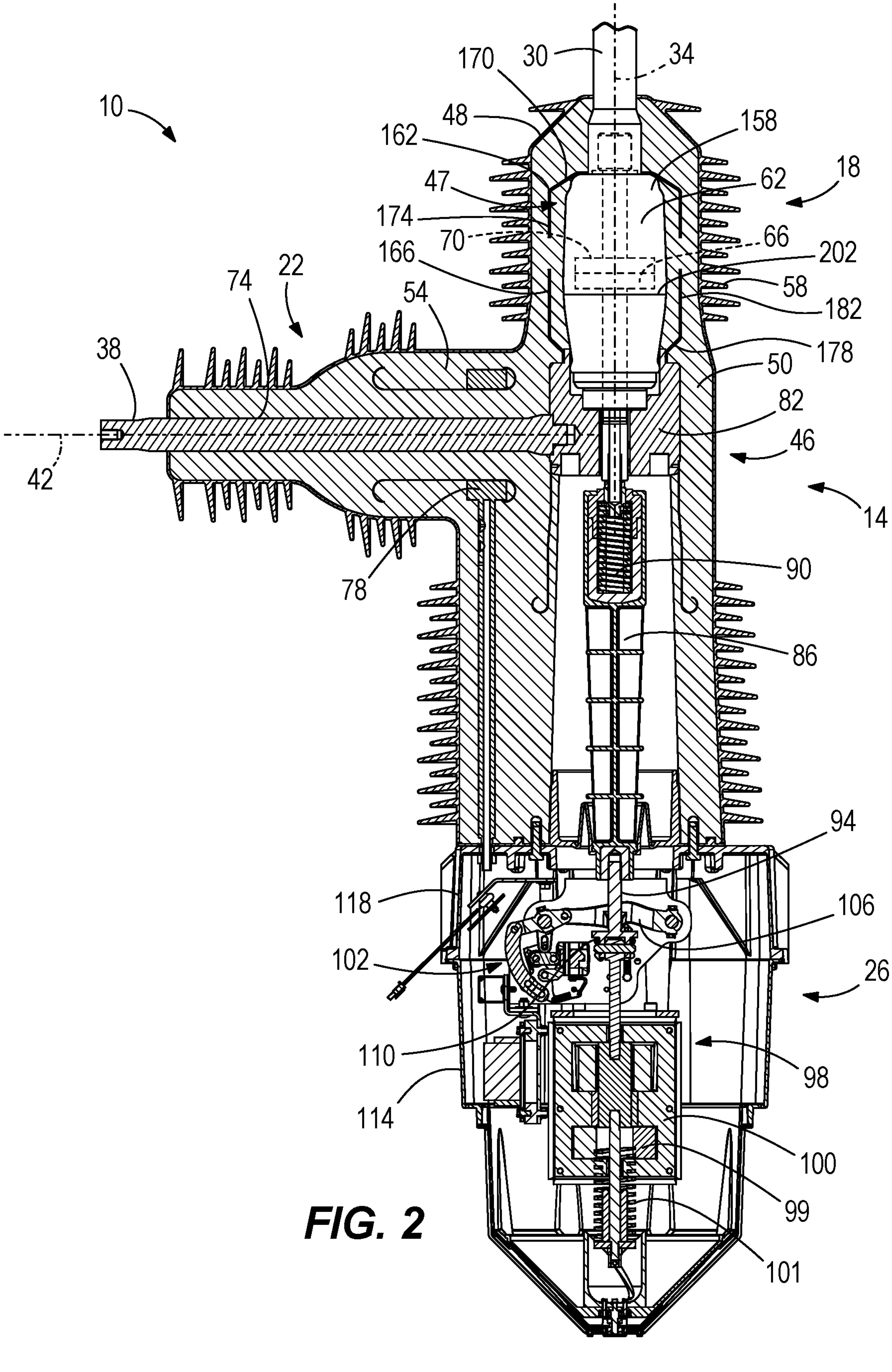
FIG. 2 illustrates a cross-sectional view of the switchgear apparatus of FIG. 1.

With reference to FIG. 2, the illustrated housing assembly 14 includes a main housing 46 with an insulating material, such as epoxy, which forms a solid dielectric module 47. The solid dielectric module 47 may be made of a silicone or cycloaliphatic epoxy. In other embodiments, the solid dielectric module 47 may be made of a fiberglass molding compound. In other embodiments, the solid dielectric module 47 may be made of other moldable dielectric materials. The main housing 46 may further include a protective layer 48 surrounding the solid dielectric module 47. In some embodiments, the protective layer 48 withstands heavily polluted environments and serves as an additional dielectric material for the switchgear apparatus 10. In some embodiments, the protective layer 48 is made of silicone rubber that is overmolded onto the solid dielectric module 47. In other embodiments, the protective layer 48 may be made of other moldable (and, in some embodiments, resilient) dielectric materials, such as polyurethane.

With continued reference to FIG. 2, the main housing 46 includes a first bushing 50 that surrounds and at least partially encapsulates the VI assembly 18 and a second bushing 54 that surrounds and at least partially encapsulates the conductor assembly 22. The silicone rubber layer 48 includes a plurality of sheds 58 extending radially outward from both bushings 50, 54. In other embodiments, the sheds 58 may be formed as part of the dielectric module 47 and covered by the silicone rubber layer 48. In yet other embodiments, the sheds 58 may be omitted. The first and second bushings 50, 54 may be integrally formed together with the dielectric module 47 of the main housing 46 as a single monolithic structure. Alternatively, the first and second bushings 50, 54 may be formed separately and coupled to the main housing 46 in a variety of ways (e.g., via a threaded connection, snap-fit, etc.).

With continued reference to FIG. 2, the illustrated VI assembly 18 includes a vacuum bottle 62 at least partially molded within the first bushing 50 of the main housing 46. In some embodiments, the vacuum bottle 62 is additionally or alternatively pressed into the first bushing 50 of the main housing 46. In some embodiments, the vacuum bottle 62 is surrounded by a sleeve 158, which may be made of a resilient dielectric material such as silicone rubber. The vacuum bottle 62 encloses a movable contact 66 and a stationary contact 70 such that the movable contact 66 and the stationary contact 70 are hermetically sealed within the vacuum bottle 62. The movable contact 66 is maintained in contact with an interchange 82 through the use of contact bands. Contact between the moveable contact 66 and the interchange 82 may be maintained through frictional contact. In some embodiments, (i) the sleeve 158 is molded around the VI assembly 18, and includes silicone, (ii) the solid dielectric module 47 is molded around the sleeve 158, and includes an epoxy, and (iii) the silicone rubber layer 48 is molded around the solid dielectric module 47 and includes silicone.

The movable contact 66 is movable along the first longitudinal axis 34 between a closed position (illustrated in FIG. 2) and an open position (not shown) to selectively establish or break contact with the stationary contact 70. The vacuum bottle 62 quickly suppresses electrical arcing that may occur when the contacts 66, 70 are opened due to the lack of conductive atmosphere within the bottle 62.

With reference to FIG. 2, the conductor assembly 22 may include a conductor 74 and a sensor assembly 78, each at least partially molded within the second bushing 54 of the main housing 46. The sensor assembly 78 may include a current sensor, a voltage sensor, partial discharge sensor, voltage indicated sensor, and/or other sensing devices. One end of the conductor 74 is electrically coupled to the movable contact 66 via the current interchange 82. The opposite end of the conductor 74 is electrically coupled to the second terminal 38. The first terminal 30 is electrically coupled to the stationary contact 70. The first terminal 30 and the second terminal 38 are configured for connection to respective electrical power transmission lines.

With continued reference to FIG. 2, the actuator assembly 26 includes a drive shaft 86 extending through the main housing 46 and coupled at one end to the movable contact 66 of the VI assembly 18. In the illustrated embodiment, the drive shaft 86 is coupled to the movable contact 66 via an encapsulated spring 90 to permit limited relative movement between the drive shaft 86 and the movable contact 66. The encapsulated spring 90 biases the movable contact 66 toward the stationary contact 70. The opposite end of the drive shaft 86 is coupled to an output shaft 94 of an electromagnetic actuator 98. The electromagnetic actuator 98 is operable to move the drive shaft 86 along the first longitudinal axis 34 and thereby move the movable contact 66 relative to the stationary contact 70. In additional or alternative embodiments, the functionality provided by the encapsulated spring 90 may be provided with an external spring and/or a spring positioned otherwise along the drive shaft 86. For example, the spring may be instead positioned at a first end or at a second end of the drive shaft 86.

With continued reference to FIG. 2, the electromagnetic actuator 98 in the illustrated embodiment includes a coil 99, a permanent magnet 100, and a spring 101. The coil 99 includes one or more copper windings which, when energized, produce a magnetic field that acts on the output shaft 94. The permanent magnet 100 is configured to hold the output shaft 94 in a position corresponding with the closed position of the movable contact 66. The spring 101 biases the output shaft 94 in an opening direction (i.e., downward in the orientation of FIG. 2). In some embodiments, the actuator assembly 26 may include other actuator configurations. For example, in some embodiments, the permanent magnet 100 may be omitted, and the output shaft 94 may be latched in the closed position in other ways. In additional or alternative embodiments, the electromagnetic actuator 98 may be omitted.

With continued reference to FIG. 2, the actuator assembly 26 includes a controller (not shown) that controls operation of the electromagnetic actuator 98. In some embodiments, the controller receives feedback from the sensor assembly 78 and energizes or de-energizes the electromagnetic actuator 98 in response to one or more sensed conditions. For example, the controller may receive feedback from the sensor assembly 78 indicating that a fault has occurred. In response, the controller may control the electromagnetic actuator 98 to automatically open the VI assembly 18 and break the circuit. The controller may also control the electromagnetic actuator 98 to automatically close the VI assembly 18 once the fault has been cleared (e.g., as indicated by the sensor assembly 78).

In the illustrated embodiment, the actuator assembly 26 further includes a manual trip assembly 102 that can be used to manually open the VI assembly 18 through the operation of the drive shaft 86 and/or other linkages. The manual trip assembly 102 includes a handle 104 accessible from an exterior of the housing assembly 14 (as shown in FIG. 1). The handle 104 is rotatable to move a yoke 106 inside the housing assembly 14 (as shown in FIG. 2). The yoke 106 is engageable with a collar 110 on the output shaft 94 to move the movable contact 66 toward the open position. The illustrated housing assembly 14 includes an actuator housing 114 enclosing the electromagnetic actuator 98 and a head casting 118 coupled between the actuator housing 114 and the main housing 46. The manual trip assembly 102 is supported by the head casting 118, and the output shaft 94 extends through the head casting 118 to the drive shaft 86.

With returning reference to FIG. 2, an operating sequence of the switchgear apparatus 10 according to certain embodiments of the present disclosure will now be described. During operation, the controller of the switchgear apparatus 10 may receive feedback from the sensor assembly 78 indicating that a fault has occurred. In response to this feedback, the controller automatically energizes the coil 99 of the electromagnetic actuator 98. The resultant magnetic field generated by the coil 99 moves the output shaft 94 in an opening direction (i.e., downward in the orientation of FIG. 2). This movement creates an air gap between the output shaft 94 and the permanent magnet 100 that greatly reduces the holding force of the permanent magnet 100. With the holding force of the permanent magnet 100 reduced, the spring 101 is able to overcome the holding force of the permanent magnet 100 and accelerate the output shaft 94 in the opening direction. As such, the coil 99 is only required to be energized momentarily to initiate movement of the output shaft 94, advantageously reducing the power drawn by the electromagnetic actuator 98 and minimizing heating of the coil 99.

With continued reference to FIG. 2, the output shaft 94 moves the drive shaft 86 in the opening direction. As the drive shaft 86 moves in the opening direction, the encapsulated spring 90, which is compressed when the contacts 66, 70 are closed, begins to expand. The spring 90 thus initially permits the drive shaft 86 to move in the opening direction relative to the movable contact 66 and maintains the movable contact 66 in fixed electrical contact with the stationary contact 70. As the drive shaft 86 continues to move and accelerate in the opening direction under the influence of the spring 101, the spring 90 reaches a fully expanded state. When the spring 90 reaches the fully expanded state, the downward movement of the drive shaft 86 is abruptly transferred to the movable contact 66. This separates the movable contact 66 from the stationary contact 70 and reduces arcing that may occur upon separating the contacts 66, 70.

With continued reference to FIG. 2, voltage shield screens and, more specifically, a first (upper) voltage shield screen 162 and a second (lower) voltage shield screen 166 may be molded within the first bushing 50. The voltage shield screens 162, 166 may be made of metal or any appropriate conductive material. The first voltage shield screen 162 may be affixed or otherwise coupled to and/or adjacent to the first terminal 30. In other words, the first voltage shield screen 162 may be coupled at or near an upper connection point 151 (FIG. 5), which is a location at which the first terminal 30 is seated against the sleeve 158. In some embodiments, the first voltage shield screen 162 may partially or entirely encircle the vacuum bottle 62 in a circumferential direction of the vacuum bottle 62. The second voltage shield screen 166 may be affixed or otherwise coupled to and/or adjacent to the current interchange 82. In other words, the second voltage shield screen 166 may be coupled at or near a lower connection point 156 (FIG. 6). In some embodiments, the second voltage shield screen 166 may partially or entirely encircle the vacuum bottle 62.

With continued reference to FIG. 2, the first voltage shield screen 162 may include a first tapered screen portion 170 and a first screen extension portion 174, and the second voltage shield screen 166 may include a second tapered screen portion 178 and a second screen extension portion 182. In the case of the first voltage shield screen 162, the first tapered screen portion 170 may extend from, or nearly from, the upper connection point 151 (FIG. 5) in a generally downward direction such that the first tapered screen portion 170 widens in a direction away from the first terminal 30. The first screen extension portion 174 may be contiguous with the first tapered screen portion 170 and may continue to extend downward parallel to or nearly parallel to the longitudinal axis 34. In the illustrated embodiment, the first screen extension portion 174 has a uniform diameter, and in other embodiments, the first screen extension portion 174 may have a nonuniform diameter and may taper or have another shape. In the case of the second voltage shield screen 166, the second tapered screen portion 178 may extend from, or nearly from, the lower connection point 156 (FIG. 6) in a generally upward direction such that the second tapered screen portion 178 widens in a direction toward the first terminal 30. The second screen extension portion 182 may be contiguous with the second tapered screen portion 178 and continue to extend upward parallel to or nearly parallel to the longitudinal axis 34. In the illustrated embodiment, the second screen extension portion 174 has a uniform diameter, and in other embodiments, the second screen extension portion 174 may have a nonuniform diameter and may taper or have another shape.

Figure 3:
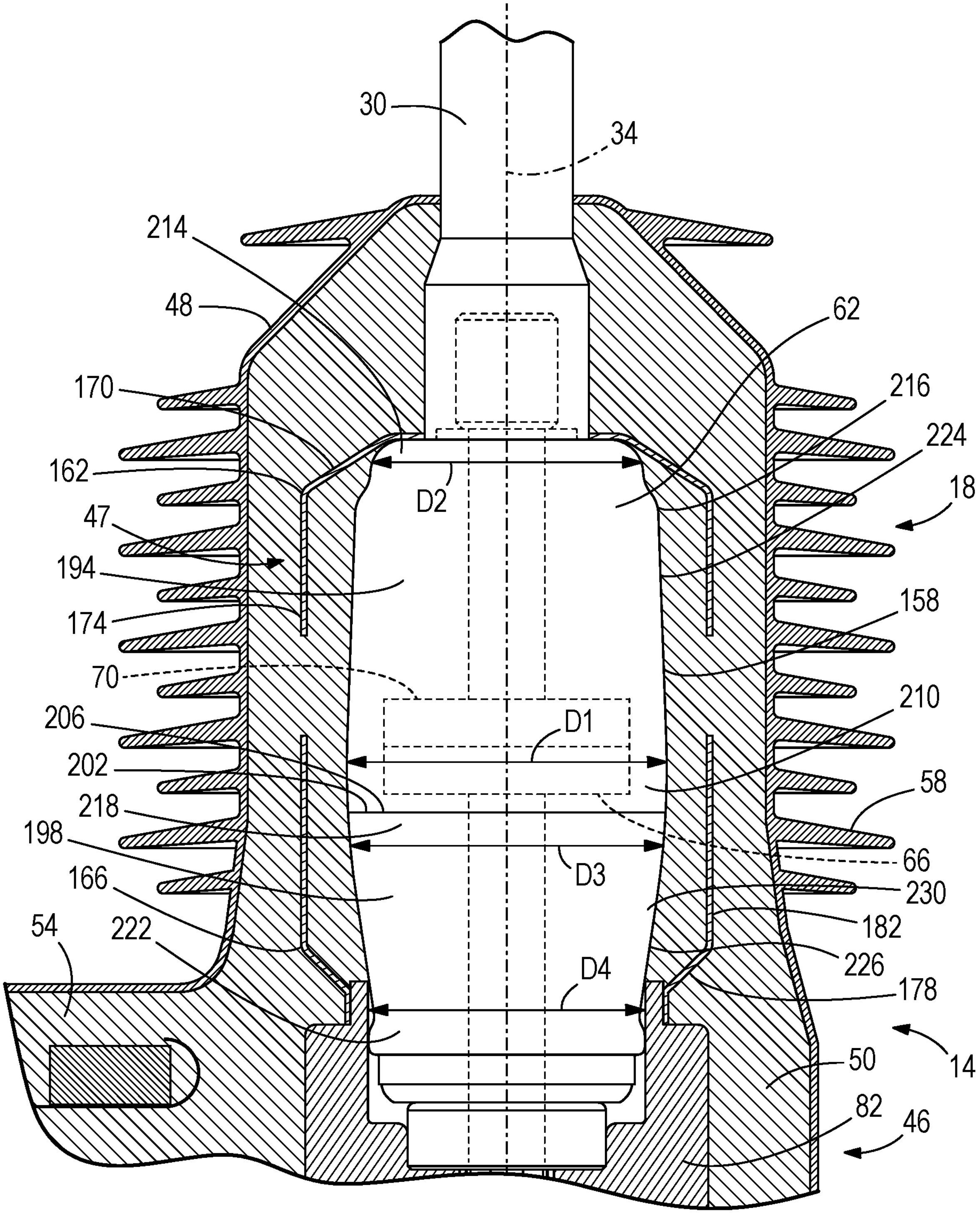
FIG. 3 illustrates a cutaway view of a vacuum interrupter assembly of the switchgear apparatus of FIG. 1 showing a parting plane in a sleeve.

With reference to FIG. 3, the sleeve 158 includes two or more portions such as, in the illustrated embodiment, a first (upper) sleeve portion 194 and a second (lower) sleeve portion 198. The first voltage shield screen 162 may at least partially surround the first sleeve portion 194, and the second voltage shield screen 166 may at least partially surround the second sleeve portion 198. The first sleeve portion 194 and the second sleeve portion 198 are integrally formed together as a single, molded body; however, a parting plane 202 is located at an interface 206 between the first sleeve portion 194 and the second sleeve portion 198 where mold halves used to form the sleeve 158 meet during molding, as described in greater detail below.

In the illustrated embodiment, the first sleeve portion 194 includes a first (lower) end 210 configured to be disposed at the interface 206 and distal from the first terminal 30. The first sleeve portion 194 also includes a second (upper) end 214 configured to be disposed proximate the first terminal 30. The second sleeve portion 194 includes a third (upper) end 218 configured to be disposed at the interface 206 and distal from the current interchange 82. The second sleeve portion 198 also includes a fourth (lower) end 222 configured to be disposed proximate the current interchange 82.

With continued reference to FIG. 3, the first sleeve portion 194 includes a first diameter D1 defined at the first (lower) end 210 and a second diameter D2 defined at the second (upper) end 214. The first sleeve portion 194 may generally taper with reference to a first outside profile 216 of the first sleeve portion 194 from a wider diameter at the first (lower) end 210 to a narrower diameter at the second (upper) end 214. Further, the first diameter D1 may be wider than the second diameter D2. Providing the first sleeve portion 194 with a generally tapering first outside profile 216 may allow, in one aspect, a mold to be removed from the first sleeve portion 194 following a molding process in which the sleeve 158 is molded around the vacuum bottle 62. More specifically, the first sleeve portion 194 may include a first draft portion 224 adjacent to the first terminal 30 that becomes wider in a direction moving away from the first terminal 30. The first draft portion 224 may have an end nearest to the first terminal 30 that is at least partially defined and/or formed by a seal as described herein.

With continued reference to FIG. 3, the second sleeve portion 198 includes a third diameter D3 defined at the third (upper) end 218 and a fourth diameter D4 defined at the fourth (lower) end 222. The second sleeve portion 198 may generally taper with reference to a second outside profile 226 of the second sleeve portion 198 from a wider diameter at the third (upper) end to a narrower diameter at the fourth (lower) end 222. Further, the third diameter D3 may be wider than the fourth diameter D4. Providing the second sleeve portion 198 with a generally tapering second outside profile 226 may allow, in one aspect, a mold to be removed from the second sleeve portion 198 following a molding process in which the sleeve 158 is molded around the vacuum bottle 62. More specifically, the second sleeve portion 198 may include a second draft portion 230 adjacent to the current interchange 82 that becomes wider in a direction moving away from the current interchange 82. The second draft portion 230 may have an end nearest to the interchange 82 that is at least partially defined and/or formed by a seal as described herein.

With continued reference to FIG. 3, in additional and/or alternative embodiments, a method related to the structure disclosed herein may include providing the vacuum bottle 62 and the first terminal 30, positioning the sleeve 158 about the vacuum bottle 62 (e.g., by molding the sleeve 158 over the vacuum bottle 62), positioning the first terminal 30 against a portion of the sleeve 158 surrounding an opening of the vacuum bottle 62, and compressing the portion of the sleeve 158, and specifically the first sleeve portion 194, between the first terminal 30 and the vacuum bottle 62 to form a seal between the first terminal 30 and the vacuum bottle 62. A contact area between the sleeve 158 and the first terminal 30 is the upper connection point 151. The method may further include encapsulating at least the upper connection point 151 by molding the dielectric material 152 over at least the upper connection point 151. Such a configuration and/or method may advantageously inhibit creepage and tracking from the VI assembly 18. In some embodiments, the sleeve 158 may be compressed before, during, and/or after molding the dielectric material 152.

Figure 4:
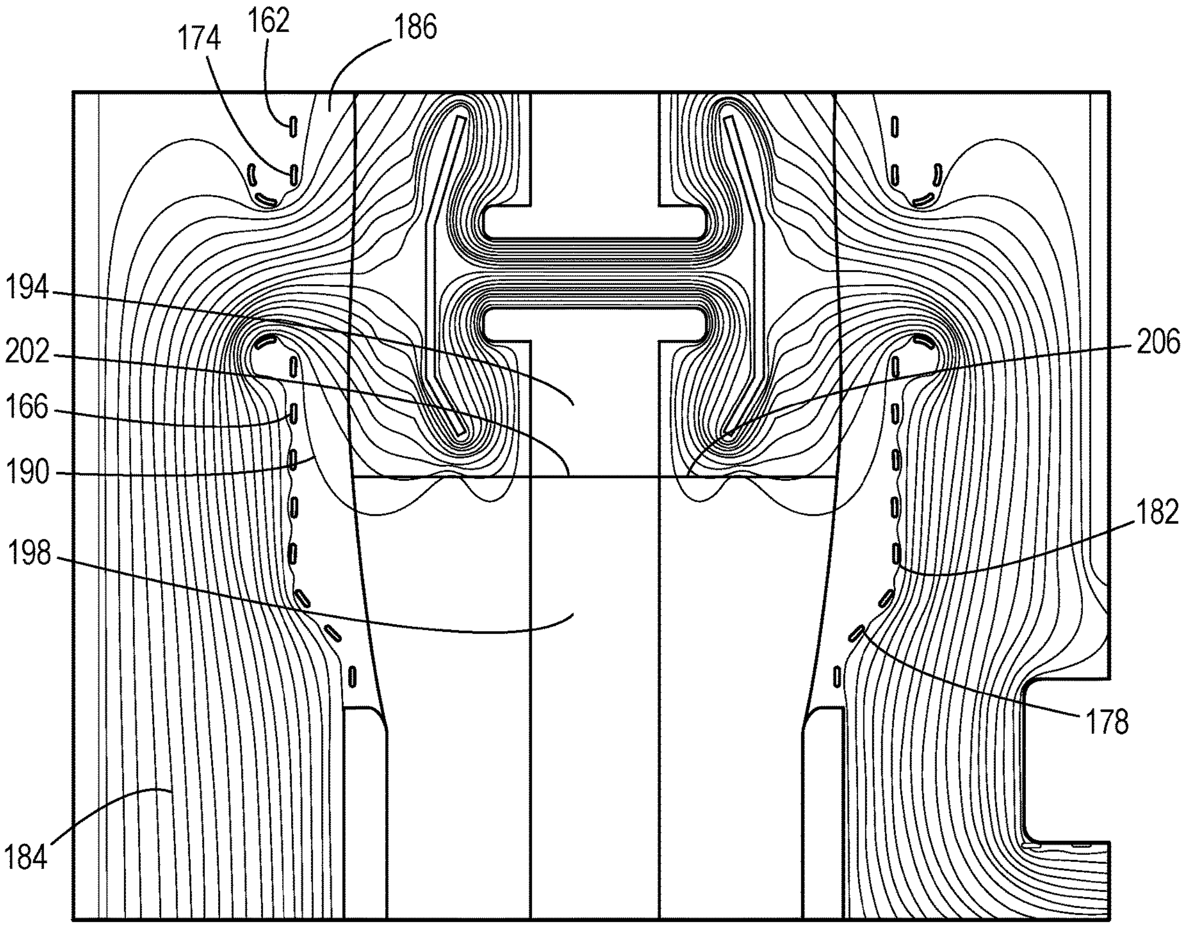
FIG. 4 illustrates a detailed cross-sectional view of a central portion of the vacuum interrupter assembly of the switchgear apparatus of FIG. 1 in operation and showing electrical stresses.

With reference to FIG. 4, in operation, the voltage shield screens 162, 166 may reduce electrical stress concentrations in areas that are interior to each of the voltage shield screens 162, 166. Electrical stress is indicated by electrical stress contour lines 184. The first voltage shield screen 162 defines a first low-stress area 186 that is interior to the first voltage shield screen 162, and the second voltage shield screen 166 defines a second low-stress area 190 that is interior to the second voltage shield screen 166. One or both of the low-stress areas 186, 190 may partially or completely encircle the vacuum bottle 62 in a circumferential direction of the vacuum bottle 62.

Returning to FIG. 3, the parting plane 202 between the first sleeve portion 194 and the second sleeve portion 198 may be oriented transverse to the longitudinal axis 34. In some embodiments, the parting plane 202 may be obliquely oriented relative to the longitudinal axis 34. In yet other embodiments, the parting plane 202 may be at least partially non-planar and may form another shape or pattern such as a zigzag pattern around the vacuum bottle 62.

With continued reference to FIG. 3 and with reference to FIG. 4, the parting plane 202 may be provided at a location such that the parting plane 202 lies entirely within one of the first low-stress area 186 or the second low-stress area 190. For example, the parting plane 202 may extend only through the first low stress area 186. In another embodiment, the parting plane 202 may extend only through the second low stress area 190. Accordingly, if the parting plane 202 is provided within the first low-stress area 186 such that the parting plane 202 is protected by the first voltage shield screen 162, then the second sleeve portion 198 may be longer than the first sleeve portion 194. If the parting plane 202 is provided within the second low-stress area 190 such that the parting plane 202 is protected by the second voltage shield screen 166, then the first sleeve portion 194 may be longer than the second sleeve portion 198. Providing the parting plane 202 entirely in one of the low-stress areas 186, 190 may inhibit electrical leakage at the parting plane 202 or may inhibit the parting plane 202 from serving as a weak point in the sleeve 158 because of the lowered electrical stress.

Figure 5:
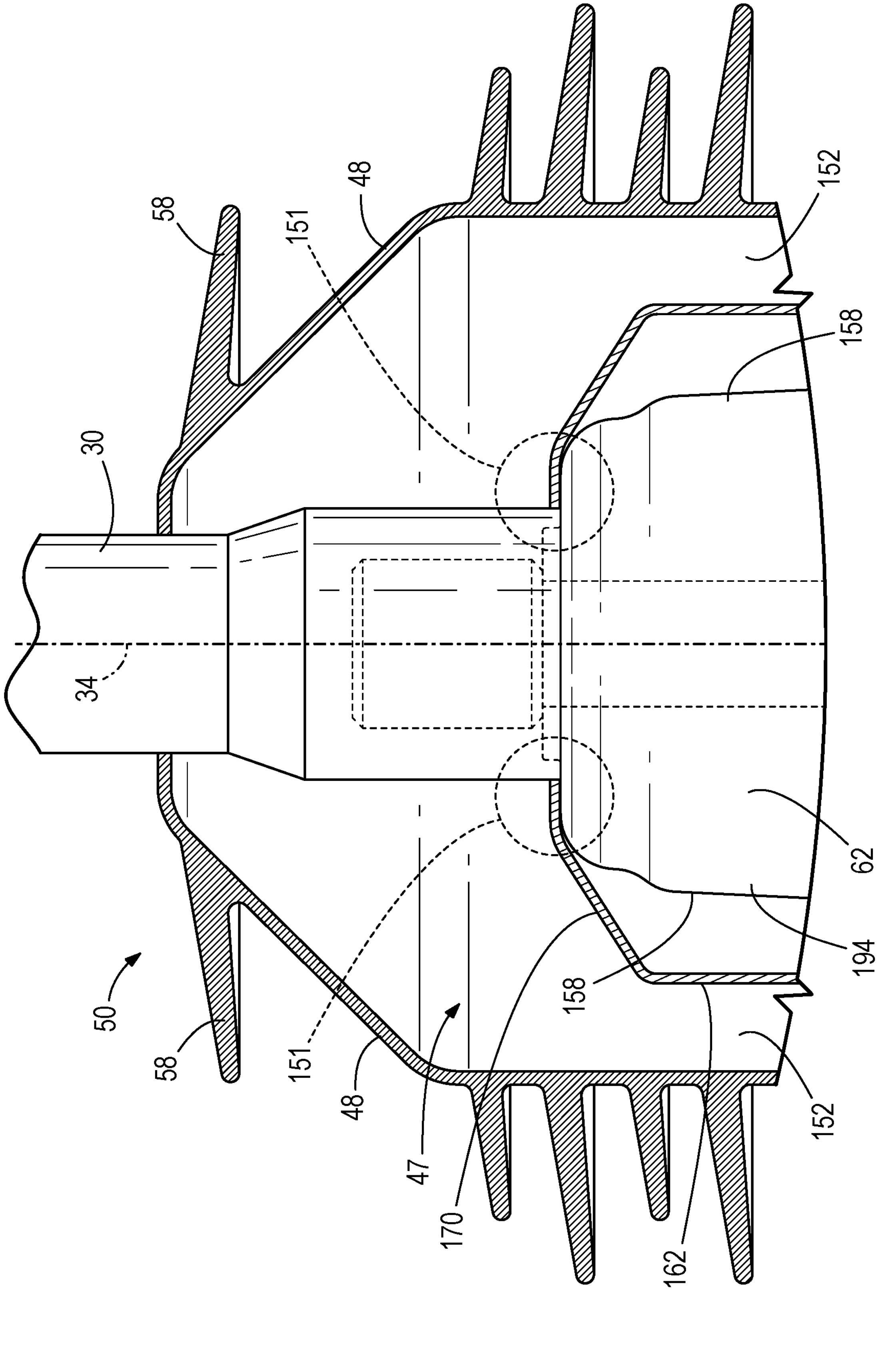
FIG. 5 illustrates a detailed, cross-sectional view of a top portion of the vacuum interrupter assembly of the switchgear apparatus of FIG. 1.
Figure 6:
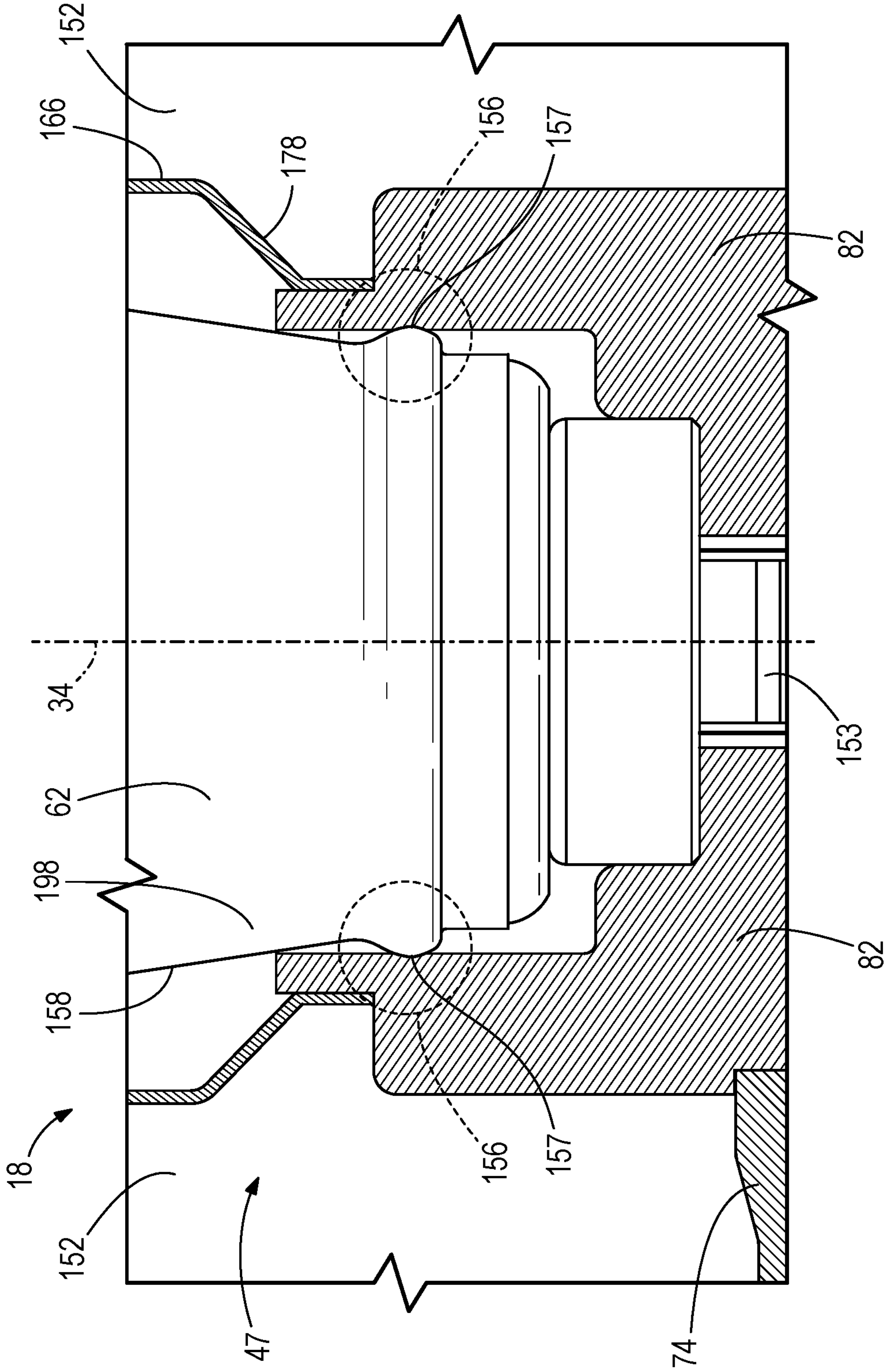
FIG. 6 illustrates a detailed, cross-sectional view of a bottom portion of the vacuum interrupter assembly of the switchgear apparatus of FIG. 1.

With reference to FIG. 5, a detailed, cross-sectional view of a top portion of the VI assembly 18 of the switchgear apparatus 10 is shown. The sleeve 158 is shown positioned around the vacuum bottle 62. The first terminal 30 is seated against the sleeve 158, and specifically against the first sleeve portion 194, at the upper connection point 151 within the first bushing 50. The sleeve 158 is compressed between the first terminal 30 and the top of the vacuum bottle 62 to form a complete seal between the first terminal 30 and the vacuum bottle 62. In the illustrated embodiment, the upper connection point 151 between the first terminal 30 and the sleeve 158 is completely molded (i.e., entirely surrounded in molding) within dielectric material 152 of the dielectric module 47 (cross-hatching of the dielectric material 152 is omitted from FIG. 5 for the purpose of more clearly illustrating the sleeve 158). In other words, the upper connection point 151 is entirely encapsulated by the dielectric material 152.

With continued reference to FIG. 5, the upper connection point 151 may provide a seal between the first terminal 30 and the sleeve 158. The first sleeve portion 194 and the second sleeve portion 198 may be configured such that no parting plane passes through the sleeve 158 in the vicinity of the first connection point 151, such as in embodiments in which a circumferential parting plane 202 is provided between the first sleeve portion 194 and the second sleeve portion 198 transverse to the longitudinal axis 34. More specifically, a circumferential parting plane 202 may be provided in which no parting plane passes through the area at which the first terminal 30 contacts the sleeve 158. As a result, the first sleeve portion 194 and the second sleeve portion 198 may be configured such that the parting plane location inhibits electrical leakage at the first connection point 151.

With reference to FIG. 6, a detailed, cross-sectional view of a bottom portion of the VI assembly 18 of the switchgear apparatus 10 of FIG. 1 is illustrated. As shown, the interchange 82 is positioned to interact with an interchange terminal 153 along the first longitudinal axis 34 (and configured to connect to the movable contact 66, shown in FIG. 2) and the connector 74 along the second longitudinal axis 42. The interchange 82 connects to the sleeve 158 positioned about the vacuum bottle 62 at the lower connection point 156.

With continued reference to FIG. 6, in the illustrated embodiment, the sleeve 158 includes at least one ridge 157 integrally formed with the sleeve 158 and surrounding the circumference of the sleeve 158 at the lower connection point 156. The interchange 82 may include a mating feature (e.g., one or more ridges, grooves, or the like) configured to cooperate with the ridge 157 on the sleeve 158 to form a seal between the vacuum bottle 62 and the interchange 82 at the lower connection point 156. In the illustrated embodiment, the lower connection point 156 is completely molded (i.e., entirely surrounded in molding) with the dielectric material 152 (cross-hatching of the dielectric material 152 is again omitted from FIG. 6 for the purpose of clarity). In other words, the lower connection point 156 is entirely encapsulated by the dielectric material 152.

With continued reference to FIG. 6, the lower connection point 156 may provide a seal between the current interchange 82 and the sleeve 158. For example, the sleeve 158, and specifically the second sleeve portion 198, may be compressed by the current interchange 82 at the lower connection point 156 to form the seal. The parting plane 202 may be configured such that no parting plane passes through the sleeve 158 in the vicinity of the second connection point 156, such as in embodiments in which a parting plane 202 is defined between the first sleeve portion 194 and the second sleeve portion 198. More specifically, a circumferential parting plane 202 may be provided in which no parting plane passes through the area at which the current interchange 82 contacts the sleeve 158 transverse to the longitudinal axis 34. In other words, in the illustrated embodiment, no parting plane passes through an area at which the sleeve 158, and more specifically, the second sleeve portion 198, is compressed by the current interchange 82. As a result, the parting plane 202 may be configured such that the parting plane 202 inhibits electrical leakage at the second connection point 156. A parting plane located in the vicinity of the lower connection point 156, for example, such as in embodiments in which a parting plane extends along the longitudinal axis 34, may contribute to electrical leakage or provide a weak point in the sleeve 158.

For example, in additional and/or alternative embodiments, a method related to the structure disclosed herein may include providing the vacuum bottle 62 within the sleeve 158 and the interchange 82, positioning a portion of the sleeve 158 around an opening of the vacuum bottle 62 against and/or partially within the interchange 82 such that the ridge 157 is located between the sleeve 158 and the interchange 82, and molding the dielectric material 152 over the sleeve 158 and the interchange 82. Such a configuration and/or method may advantageously prevent the dielectric material 152 (e.g., epoxy) from leaking into the connection between the vacuum bottle 62 and the interchange 82 during molding. In addition, by sealing between the vacuum bottle 62 and the interchange 82, the sleeve 158 may also inhibit creepage and tracking from the VI assembly 18 at the lower connection point 156.

Figure 7:
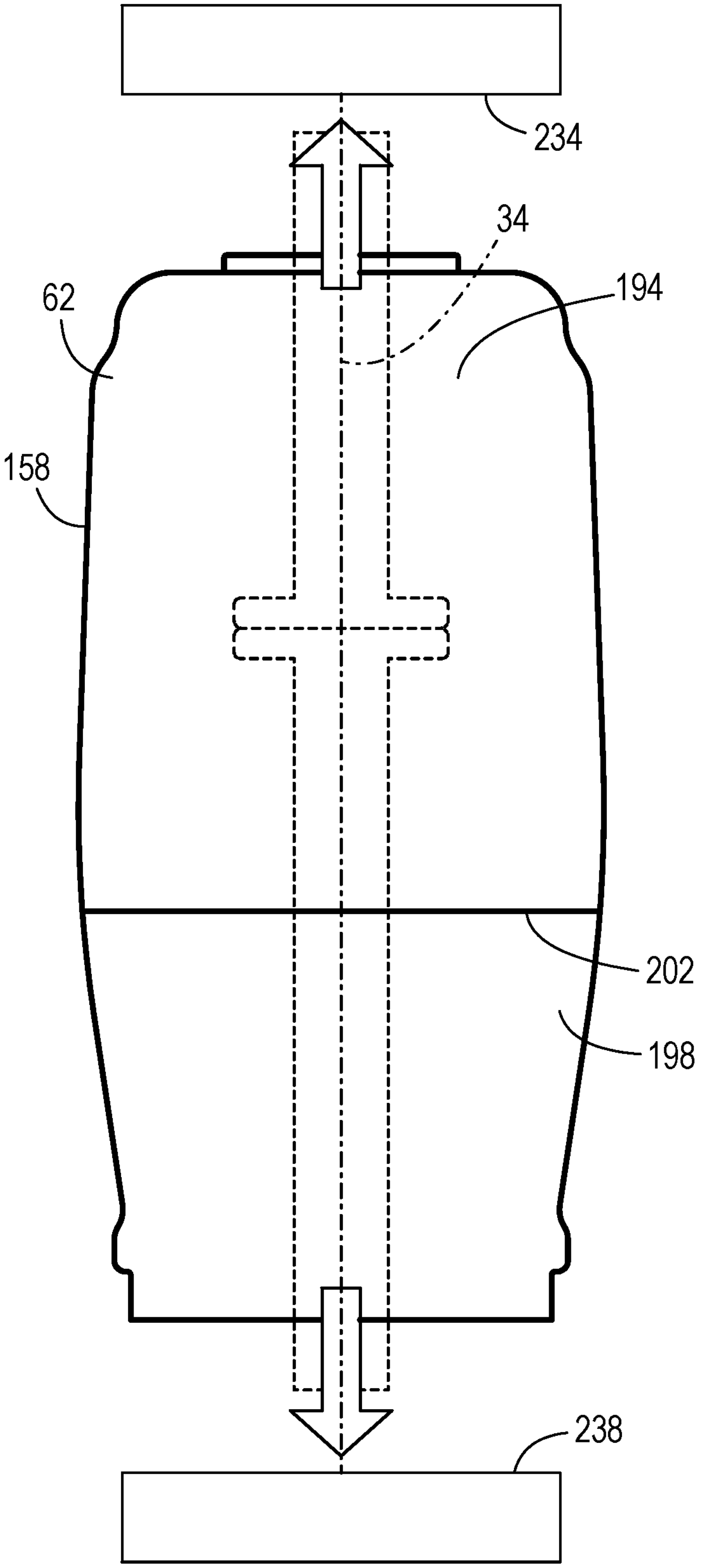
FIG. 7 illustrates a process of molding the sleeve of FIG. 3.

With reference to FIG. 7, a process of molding the sleeve 158 around the vacuum bottle 62 includes molding the first sleeve portion 194 with a first mold tool 234 and molding the second sleeve portion 198 with a second mold tool 238. During the molding process, the first mold tool 234 and the second mold tool 238 may meet along the parting plane 202. As described herein, a parting line defined where the parting plane 202 intersects the sleeve 158 may encircle the vacuum bottle 62 around the longitudinal axis 34 (FIG. 3). At a conclusion of the molding process, the first mold tool 234 and the second mold tool 238 may be removed from around the vacuum bottle 62 by moving the first mold tool 234 and the second mold tool 238 in opposite directions. In other words, the first mold tool 234 may be moved in an upper direction, and the second mold tool 238 may be moved in a lower direction. More specifically, the first mold tool 234 may be moved in a first direction along the longitudinal axis 34, and the second mold tool 238 may be moved in a second direction along the longitudinal axis 34. The first mold tool 234 forms the first sleeve portion 194, and the second mold tool 238 forms the second sleeve portion 198, such that the first sleeve portion 194 and the second sleeve portion 198 are integrally formed together as a single molded body. A first parting plane 270 is located at an interface 274 between the first sleeve portion 246 and the second sleeve portion 254. Thus, the parting plane 202 is located an interface 206 between the first sleeve portion 194 and the second sleeve portion 198.

Figure 8:
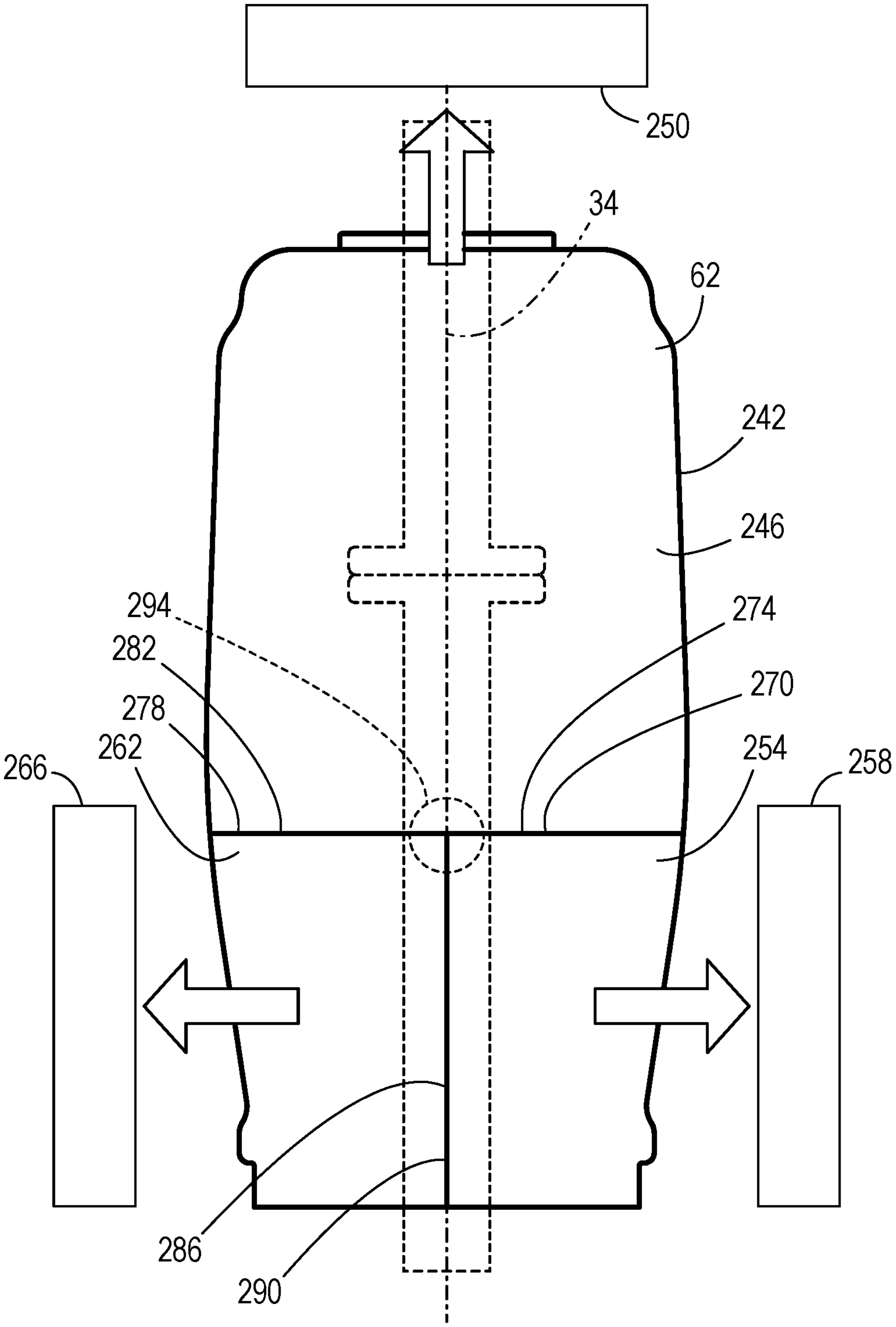
FIG. 8 illustrates a process of molding a sleeve according to an embodiment of the present disclosure.

According to another embodiment, and with reference to FIG. 8, a process of molding a sleeve 242 around a vacuum bottle 62 includes molding a first sleeve portion 246 with a first mold tool 250, molding a second sleeve portion 254 with a second mold tool 258, and molding a third sleeve portion 262 with a third mold tool 266. A first parting plane 270 is located at an interface 274 between the first sleeve portion 246 and the second sleeve portion 254. A second parting plane 278 is located at an interface 282 between the first sleeve portion 246 and the third sleeve portion 262. A third parting plane 286 is located at an interface 290 between the second sleeve portion 254 and the third sleeve portion 262. The parting planes 270, 278 may be coplanar in some embodiments. The parting planes 270, 278, 286 may be located at positions along the longitudinal axis 34 such that the parting planes 270, 278, 286 are located entirely within at least one of the voltage shield screens 162, 166.

With continued reference to FIG. 8, the third parting plane 286 in the illustrated embodiment extends parallel to the longitudinal axis 34 and perpendicular to the parting planes 270, 278. In other embodiments, the third parting plane 286 may extend at another angle (i.e., an angle greater than zero degrees) relative to the parting planes 270, 278. The third parting plane 286 meets the first and second parting planes 270, 278 at a parting plane junction location 294. At a conclusion of the molding process, the first mold tool 250 may be removed from around the vacuum bottle 62 by moving the first mold tool 250 in a direction perpendicular, nearly perpendicular, or oblique to directions in which the second mold tool 258 and the third mold tool 266 are moved. The second mold tool 258 may be moved in a direction opposite to a direction in which the third mold tool 266 is moved. The second mold tool 258 may be moved in a direction lateral to the longitudinal axis 34, and the third mold tool 266 may be moved in a direction lateral to the longitudinal axis 34 and different from a direction in which the second mold tool 258 is moved. The first mold tool 250 forms the first sleeve portion 246, the second mold tool 258 forms the second sleeve portion 254, and the third mold tool 266 forms the third sleeve portion 262.

In some embodiments, the parting planes 270, 278, 286 may be at least partially non-planar, including various parting geometries such as a zigzag, curve, bend, or the like extending upwardly and/or downwardly around a perimeter of a cylinder defined by an outside of the vacuum bottle 62.

Thus, the present disclosure provides, among other things, a switchgear apparatus including a vacuum bottle with a sleeve overmolded over the vacuum bottle using a mold configuration with a parting plane that does not extend along an entire length of the vacuum bottle. For example, in some embodiments the parting plane of the mold configuration extends transverse to a longitudinal axis of the vacuum bottle. The parting plane may be located in a region of low electrical stress (e.g., inside a voltage shield screen) to reduce flashover occurrences at high volage.

In other embodiments, other types of electrical devices that include an electrical conductor, such as terminations, bushings, and cables, in addition to vacuum interrupter assemblies, may include an insulator overmolded on the device's conductor and having a parting plane that is transverse to a longitudinal axis of the electrical device or otherwise positioned in a low electrical stress area. For example, with reference to FIG. 9, a cable accessory 300 may be a cable termination 300. The cable accessory 300 includes an insulator housing 304 that is formed from a first insulator portion 305 and a second insulator portion 306 and that includes a plurality of sheds 308 circumferentially encircling the insulator housing 304. The cable accessory 300 includes a conductor 312 that extends within the insulator housing 304 along the cable accessory's longitudinal axis 316.

Figure 9:
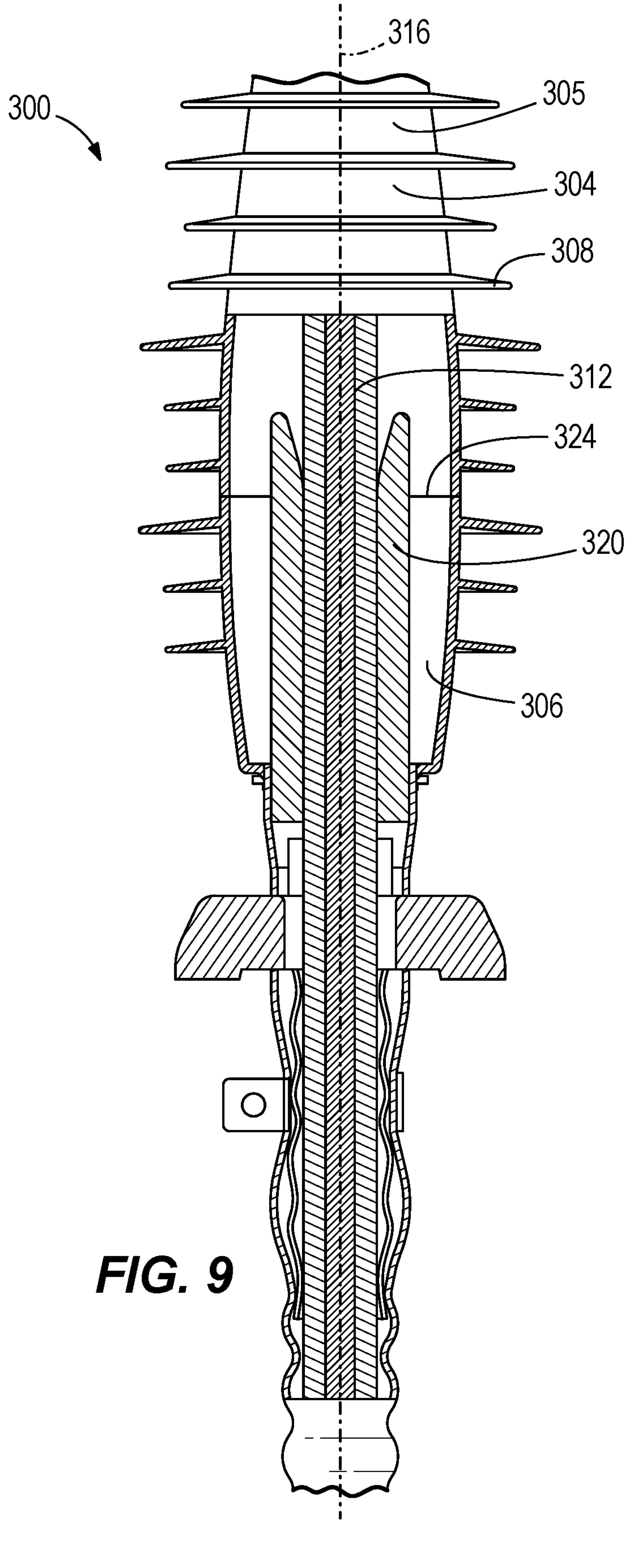
FIG. 9 illustrates a partial cross-sectional view of a cable accessory showing a parting plane in a sleeve.

With continued reference to FIG. 9, the insulator housing 304 is made of an electrically insulating material such as, for example, silicone, rubber, or the like. In the illustrated embodiment, an electrical shield 320 is positioned within the insulator housing 304 and around the conductor 312. The shield 320 controls the electrical field generated by the conductor 312 to reduce areas of high electrical stress.

The insulator housing 304 may be formed by an overmolding process which, in the illustrated embodiment, positions a parting plane 324 formed between the first insulator portion 305 and second insulator portion 306 radially outward from the shield 320. The shield 320 thus shields the parting plane 324 of the insulator housing 304 from areas of high electrical stress generated by conductor 312 and the geometries of conducting components. In other words, the parting plane 324 is positioned between the first insulator portion 305 and second insulator portion 306 and around the shield 320 in an area of low electrical stress. In the illustrated embodiment, the parting plane 324 (i.e., the parting line between the first insulator portion 305 and the second insulator portion 306) is oriented transverse to the longitudinal axis 316 in a generally straight line as depicted in the cross-sectional view of FIG. 9. In other embodiments, the parting plane 324 may be at least partially non-planar and may form another shape or pattern such as a zigzag pattern around the shield 320.

Various features and advantages of the disclosure are set forth in the following claims.

What is claimed is:

1. An electrical device comprising:

a vacuum bottle extending along a longitudinal axis and having a first portion and a second portion;

a sleeve overmolded on the vacuum bottle such that the sleeve includes a first sleeve portion, a second sleeve portion, and a parting plane at an interface between the first and second sleeve portions, wherein the parting plane intersects the longitudinal axis;

a terminal extending from the first portion of the vacuum bottle; and an interchange coupled to the second portion of the vacuum bottle.

2. The electrical device of claim 1, further comprising an electrical shield screen positioned adjacent the terminal, wherein the electrical shield screen forms a low-stress area and the parting plane lies entirely within the low-stress area.

3. The electrical device of claim 1, wherein the sleeve is compressed between the terminal extending from the first portion of the vacuum bottle and the first portion of the vacuum bottle, and no portion of the parting plane passes through an area in which the sleeve contacts the first terminal.

4. The electrical device of claim 1, wherein the parting plane is oriented transverse relative to the longitudinal axis.

5. The electrical device of claim 1, wherein the sleeve forms a seal between the interchange and the second portion of the vacuum bottle, and no portion of the parting plane passes through the seal.

6. The electrical device of claim 1, wherein the parting plane is a first parting plane, wherein the second sleeve portion further includes a second parting plane that divides the second sleeve portion in two, and wherein the second parting plane is oriented at an angle greater than zero degrees relative to the first parting plane.

7. The electrical device of claim 6, wherein the sleeve is compressed between the terminal extending from the first portion of the vacuum bottle and the first portion of the vacuum bottle, wherein the sleeve forms a seal between the interchange and the second portion of the vacuum bottle, and wherein no portion of the first parting plane or second parting plane passes through an area in which the sleeve contacts the first terminal or through the seal.

8. The electrical device of claim 6, wherein the second parting plane is oriented transverse relative to the first parting plane.

9. The electrical device of claim 1, further comprising an electrical shield screen positioned adjacent the interchange, wherein the electrical shield screen forms a low-stress area, and the parting plane lies entirely within the low-stress area.

10. The electrical device of claim 1, further comprising an electrical shield screen positioned adjacent the first portion of the vacuum bottle, wherein the electrical shield screen forms a low-stress area, and the parting plane lies entirely within the low-stress area.

11. The electrical device of claim 1, further comprising an electrical shield screen at least partially surrounding the vacuum bottle, wherein the electrical shield screen forms a low-stress area, and the parting plane lies entirely within the low-stress area.

12. The electrical device of claim 1, wherein the first sleeve portion includes a first draft portion adjacent to the terminal that becomes wider in a longitudinal direction moving away from the terminal and the second sleeve portion includes a second draft portion adjacent to the interchange that becomes wider in a longitudinal direction moving away from the interchange.

13. The electrical device of claim 1, wherein the sleeve is compressed between the terminal extending from the first portion of the vacuum bottle and the first portion of the vacuum bottle, wherein the sleeve forms a seal between the interchange and the second portion of the vacuum bottle, and no portion of the parting plane passes through an area in which the sleeve contacts the first terminal or through the seal.

14. An electrical device comprising:

a vacuum bottle extending along a longitudinal axis and having a first portion and a second portion, the vacuum bottle including a pair of electrical contacts configured to open and close an electric circuit; and a sleeve overmolded on the vacuum bottle such that the sleeve includes a first sleeve portion, a second sleeve portion, and a parting plane at an interface between the first and second sleeve portions, wherein the parting plane intersects the longitudinal axis.

15. The electrical device of claim 14, further comprising an electrical shield screen at least partially surrounding the vacuum bottle, wherein the electrical shield screen forms a low-stress area, and the parting plane lies entirely within the low-stress area.

16. The electrical device of claim 14, wherein the parting plane is a first parting plane, wherein the second sleeve portion further includes a second parting plane that divides the second sleeve portion in two, and wherein the second parting plane is oriented at an angle greater than zero degrees relative to the first parting plane.

17. The electrical device of claim 16, wherein the second parting plane is oriented transverse relative to the first parting plane.

18. An electrical device comprising:

an internal electrical conductor extending along a longitudinal axis;

an insulator overmolded around the internal electrical conductor such that the insulator includes a first insulator portion, a second insulator portion, and a parting plane at an interface between the first and second insulator portions, wherein the parting plane intersects the longitudinal axis.

19. The electrical device of claim 18, further comprising a low stress area defined by an electrical shield, wherein the parting plane is disposed entirely within the low stress area.

20. The electrical device of claim 18, wherein the parting plane is oriented transverse relative to the longitudinal axis.

21. The electrical device of claim 18, wherein the parting plane is a first parting plane, wherein the second insulator portion includes a second parting plane that divides the second insulator portion in two, and wherein the second parting plane is oriented at an angle greater than zero degrees relative to the first parting plane.

22. The electrical device of claim 21, wherein the second parting plane is oriented transverse relative to the first parting plane.

* * * * *